United States Patent
Sherman

(10) Patent No.: US 8,649,953 B2
(45) Date of Patent: Feb. 11, 2014

(54) SLIP CONTROL FOR A MATERIALS HANDLING VEHICLE

(75) Inventor: Nicholas J. Sherman, Minster, OH (US)

(73) Assignee: Crown Equipment Corporation, New Bremen, OH (US)

(*) Notice: Subject to any disclaimer, the term of this patent is extended or adjusted under 35 U.S.C. 154(b) by 662 days.

(21) Appl. No.: 12/432,069

(22) Filed: Apr. 29, 2009

(65) Prior Publication Data

US 2009/0276134 A1 Nov. 5, 2009

Related U.S. Application Data

(60) Provisional application No. 61/050,427, filed on May 5, 2008, provisional application No. 61/153,367, filed on Feb. 18, 2009.

(51) Int. Cl.
| | |
|---|---|
| G06F 17/00 | (2006.01) |
| G06F 19/00 | (2011.01) |
| B60T 8/32 | (2006.01) |
| B60K 28/16 | (2006.01) |

(52) U.S. Cl.
USPC .............. 701/82; 701/90; 701/93; 180/197; 180/282

(58) Field of Classification Search
USPC ............ 701/1, 22, 29, 35, 36, 41, 70, 71, 72, 701/74, 75, 82, 84, 90, 93, 29.1; 180/170, 180/197, 271, 272, 282
See application file for complete search history.

(56) References Cited

U.S. PATENT DOCUMENTS

| | | |
|---|---|---|
| 5,057,728 A | 10/1991 | Dammeyer et al. |
| 5,509,509 A | 4/1996 | Dammeyer et al. |
| 5,586,620 A | 12/1996 | Dammeyer et al. |
| 5,995,001 A | 11/1999 | Wellman et al. |
| 6,173,226 B1 | 1/2001 | Yoshida et al. |
| 6,236,927 B1 | 5/2001 | Sherman |

(Continued)

FOREIGN PATENT DOCUMENTS

| | | |
|---|---|---|
| DE | 43 44 634 A1 | 7/1995 |
| DE | 196 37 467 A1 | 4/1997 |

(Continued)

OTHER PUBLICATIONS

U.S. Appl. No. 12/432,044, filed Mar. 29, 2009 entitled, "Slip Control for a Materials Handling Vehicle".

(Continued)

Primary Examiner — Thomas Tarcza
Assistant Examiner — Edward Pipala
(74) Attorney, Agent, or Firm — Stevens & Showalter LLP

(57) ABSTRACT

A vehicle is provided comprising: a main body; a plurality of wheels coupled to the main body; a traction motor associated with the main body and coupled to at least one of the wheels for driving the one wheel; control apparatus coupled to the traction motor and generating a motor drive signal to the traction motor; a first sensor for generating a velocity signal indicative of a velocity of the driven wheel; and a further sensor for sensing an acceleration of the main body and generating a vehicle acceleration signal. The control apparatus determining a measured velocity of the driven wheel from the first sensor speed signal, calculating a velocity of the vehicle using the vehicle acceleration signal and comparing the measured velocity of the driven wheel to the calculated velocity of the vehicle to determine wheel slip status.

19 Claims, 9 Drawing Sheets

(56) References Cited

U.S. PATENT DOCUMENTS

| | | | |
|---|---|---|---|
| 6,782,961 | B1 | 8/2004 | Ishikawa et al. |
| 6,810,317 | B2 * | 10/2004 | Sauter et al. ............ 701/70 |
| 7,165,819 | B2 | 1/2007 | Yokoyama |
| 7,254,472 | B2 | 8/2007 | Larsen et al. |
| 7,634,344 | B2 * | 12/2009 | Masuda et al. ............ 701/69 |
| 7,681,963 | B2 | 3/2010 | Sherman et al. |
| 7,873,459 | B2 | 1/2011 | Fodor et al. |
| 2002/0099490 | A1 | 7/2002 | Wakamatsu et al. |
| 2002/0129985 | A1 | 9/2002 | Nissen et al. |
| 2003/0010559 | A1 * | 1/2003 | Suzuki ............ 180/233 |
| 2006/0178797 | A1 | 8/2006 | Larsen et al. |
| 2008/0319609 | A1 | 12/2008 | Poilbout |
| 2009/0026984 | A1 | 1/2009 | Nakamura et al. |
| 2009/0055047 | A1 | 2/2009 | Poilbout |
| 2010/0114415 | A1 | 5/2010 | Arnsby |

FOREIGN PATENT DOCUMENTS

| | | | |
|---|---|---|---|
| EP | 1 093 986 | A2 | 4/2001 |
| EP | 1 225 078 | A2 | 7/2002 |
| EP | 1666301 | A1 | 6/2006 |
| EP | 1 764 254 | A1 | 3/2007 |
| EP | 1 905 637 | A1 | 4/2008 |
| EP | 2172359 | A1 | 4/2010 |
| GB | 2 293 148 | A | 3/1996 |

OTHER PUBLICATIONS

Massimo Colonna; International Search Report and Written Opinion of the International Searching Authority; International Application No. PCT/US2009/042053; Jul. 17, 2009; European Patent Office.

Massimo Colonna; International Search Report and Written Opinion of the International Searching Authority; International Application No. PCT/US2009/042062; Jul. 17, 2009; European Patent Office.

To, Toan C.; Non-final Office Action in U.S. Appl. No. 12/432,044; Jun. 23, 2011; U.S. Patent and Trademark Office; Alexandria, VA.

Wang, Fan; First Office Action; Application No. 200980123194.1; Dec. 5, 2012; State Intellectual Property Office of the People's Republic of China.

To, Toan C.; Notice of Allowance in U.S. Appl. No. 12/432,044; Nov. 17, 2011; U.S. Patent and Trademark Office; Alexandria, VA.

* cited by examiner

SLIP CONTROL FOR A MATERIALS HANDLING VEHICLE

RELATED APPLICATIONS

This application claims the benefit of: U.S. Provisional Application No. 61/050,427, filed May 5, 2008 and entitled "SLIP CONTROL FOR A MATERIALS HANDLING VEHICLE"; and U.S. Provisional Application No. 61/153,367, filed Feb. 18, 2009 and entitled "SLIP CONTROL FOR A MATERIALS HANDLING VEHICLE," the disclosures of which are incorporated herein by reference.

FIELD OF THE INVENTION

The present invention relates to a materials handling vehicle having slip control and, more specifically, to a materials handling vehicle that estimates if unacceptable slip is occurring at a driven wheel.

BACKGROUND OF THE INVENTION

A fork lift truck is known that comprises a power unit comprising an operator's compartment, a battery compartment, and a motor compartment. A battery in the battery compartment supplies power to a traction motor, which is located in the motor compartment and connected to a "driven wheel". If the driven wheel "slips" during operation of the truck, drive efficiency is reduced and excessive wear of the driven wheel occurs.

SUMMARY OF THE INVENTION

In accordance with a first aspect of the present invention, a vehicle is provided comprising: a main body; a plurality of wheels coupled to the main body; a traction motor associated with the main body and coupled to at least one of the wheels for driving the one wheel; control apparatus coupled to the traction motor and generating a motor drive signal to the traction motor; a first sensor for generating a velocity signal indicative of a velocity of the driven wheel; and a further sensor for sensing an acceleration of the main body and generating a vehicle acceleration signal. The control apparatus determining a measured velocity of the driven wheel from the first sensor speed signal, calculating a velocity of the vehicle using the vehicle acceleration signal and comparing the measured velocity of the driven wheel to the calculated velocity of the vehicle to determine wheel slip status.

The control apparatus may determine the wheel slip status by estimating if unacceptable slip is occurring at the driven wheel based on the comparison of the measured velocity of the driven wheel and the calculated velocity of the vehicle.

The control apparatus may sample the vehicle acceleration signal during each of one or more predefined time periods to determine a new acceleration signal value and calculate a vehicle linear velocity change for each predefined time period by multiplying the new acceleration signal value by the time period.

The control apparatus may define an initial linear velocity of the vehicle as being equal to a current measured velocity of the driven wheel, add a first vehicle linear velocity change to the initial linear velocity to get a first updated vehicle linear velocity and, thereafter, add each subsequent linear velocity change to the prior updated vehicle linear velocity to get a new updated vehicle linear velocity.

When a positive torque is being applied to the driven wheel by the traction motor, the control apparatus may determine if the measured linear velocity of the driven wheel minus the calculated linear velocity of the vehicle is greater than a predefined value and, if so, conclude that driven wheel slip is unacceptable.

When a negative torque is being applied to the driven wheel by the traction motor, the control apparatus may determine if the calculated linear velocity of the vehicle minus the measured linear velocity of the driven wheel is greater than the predefined value and, if so, conclude that driven wheel slip is unacceptable.

The predefined value may be equal to one mile/hour.

In accordance with a second aspect of the present invention, a vehicle is provided comprising: a main body; a plurality of wheels coupled to the main body; a traction motor associated with the main body and coupled to at least one of the wheels for driving the one wheel; control apparatus coupled to the traction motor and generating a motor drive signal to the traction motor; a first sensor for generating a velocity signal indicative of a velocity of the driven wheel; and a further sensor for sensing an acceleration of the main body and generating a vehicle acceleration signal. The control apparatus may set a timer for a predetermined time period when one or more vehicle conditions are met and during the predetermined time period determine a measured velocity of the driven wheel from the first sensor speed signal, calculate a velocity of the vehicle using the vehicle acceleration signal, and compare the measured velocity of the driven wheel to the calculated velocity of the vehicle to determine wheel slip status.

The control apparatus may determine the wheel slip status by estimating if unacceptable slip is occurring at the driven wheel based on the comparison of the measured velocity of the driven wheel and the calculated velocity of the vehicle.

The control apparatus may sample the vehicle acceleration signal during each of one or more predefined time periods during the predetermined time period to determine a new acceleration signal value and calculate a vehicle linear velocity change for each predefined time period by multiplying the new acceleration signal value by the time period.

The control apparatus, at the start of the predetermined time period, may define an initial linear velocity of the vehicle as being equal to a current measured velocity of the driven wheel, add a first vehicle linear velocity change to the initial linear velocity to get a first updated vehicle linear velocity and, thereafter, add each subsequent linear velocity change to the prior updated vehicle linear velocity to get a new updated vehicle linear velocity.

The one or more vehicle conditions may comprise a magnitude of a torque applied by the traction motor to the driven wheel being less than a predefined value. The predefined torque value may be equal to 5 Nm. One of the wheels may comprise a steerable wheel. The one or more vehicle conditions may further comprise a steer angle of the steerable wheel being less than a predetermined value. The predetermined steerable wheel angle value may be 20 degrees.

DETAILED DESCRIPTION OF THE INVENTION

Figure 1:
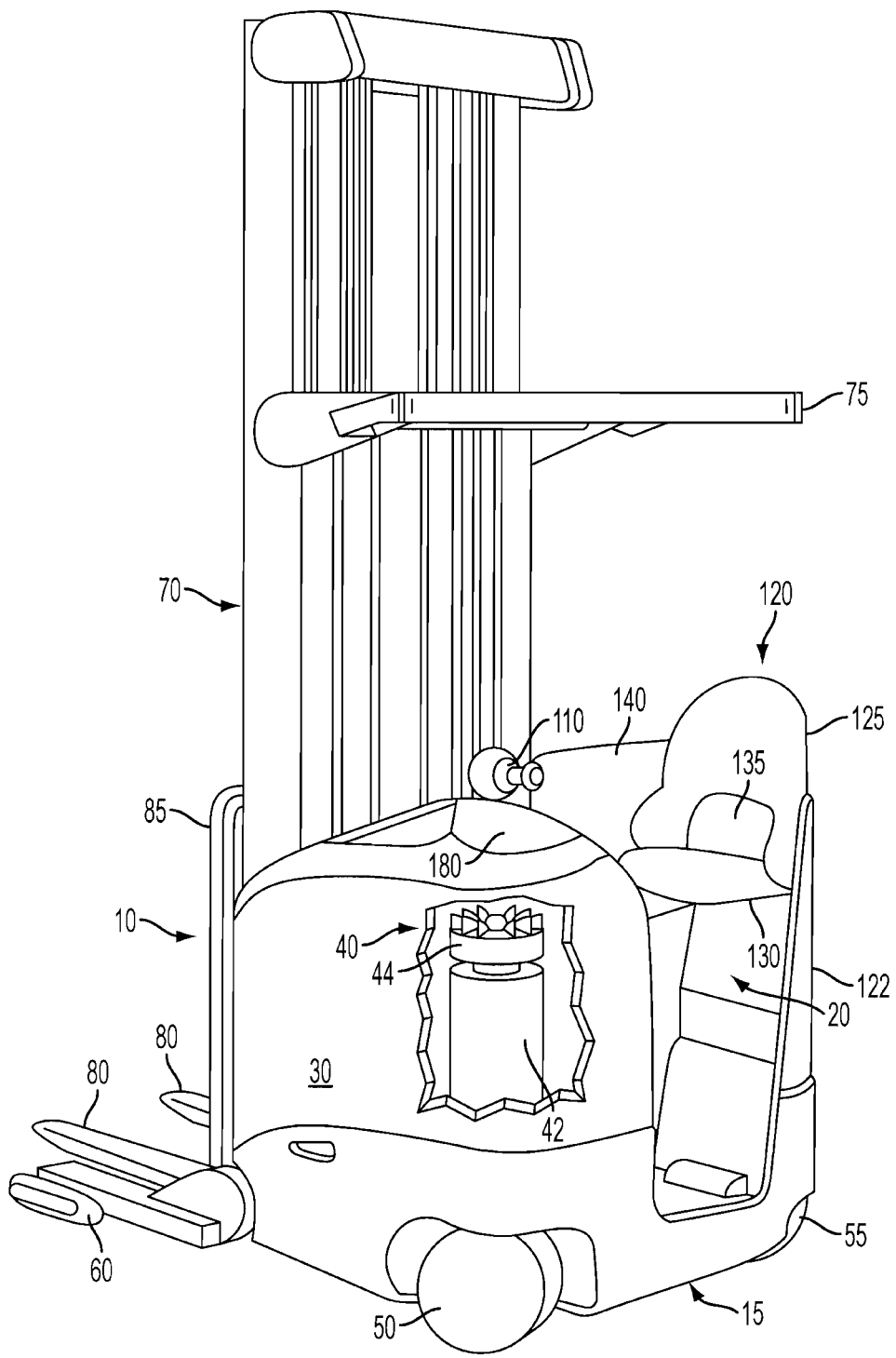
FIG. 1 is a perspective view of a vehicle constructed in accordance with the present invention with a portion of the main body removed.
Figure 2:
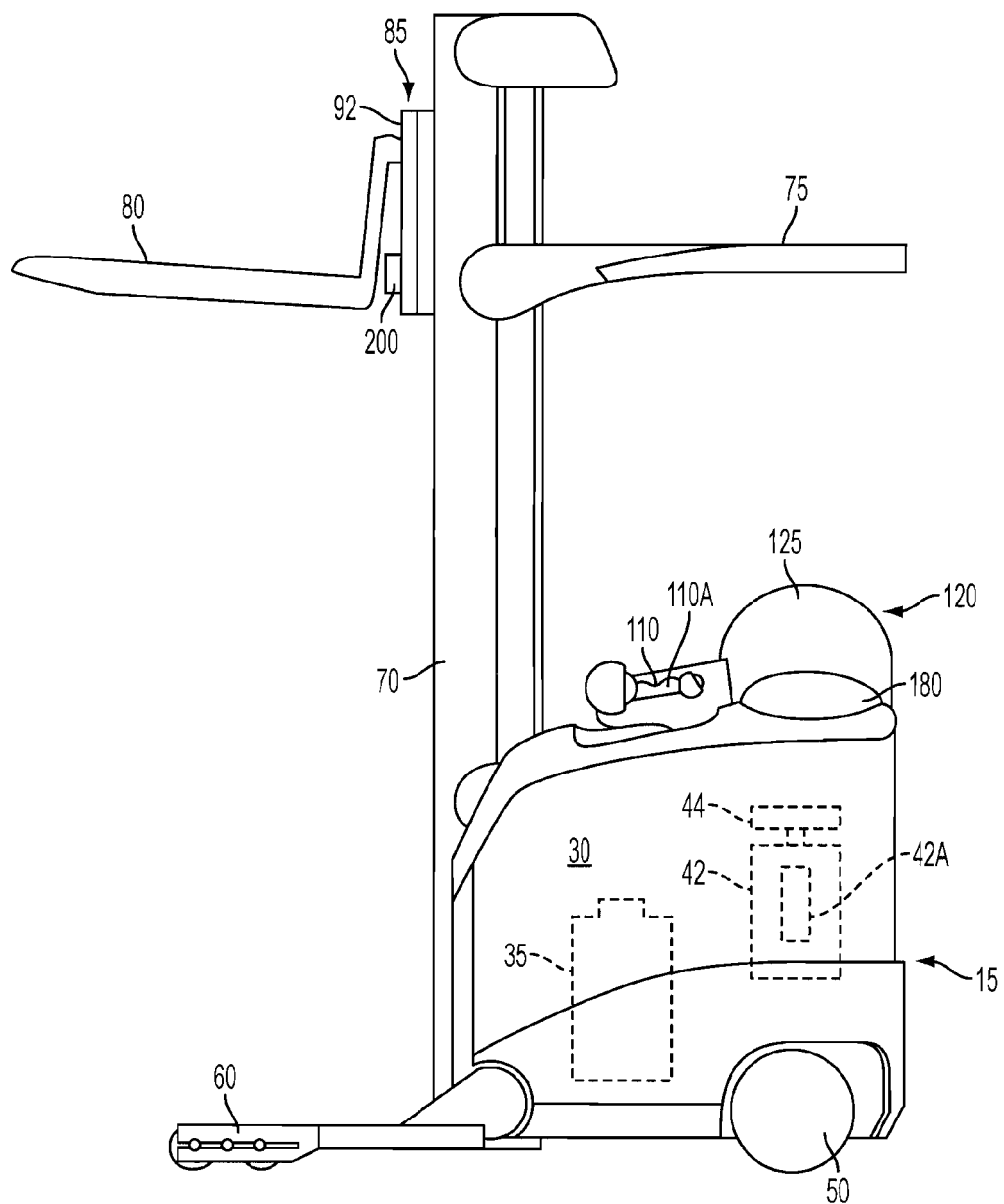
FIG. 2 is a side view of the vehicle illustrated in FIG. 1.
Figure 3:
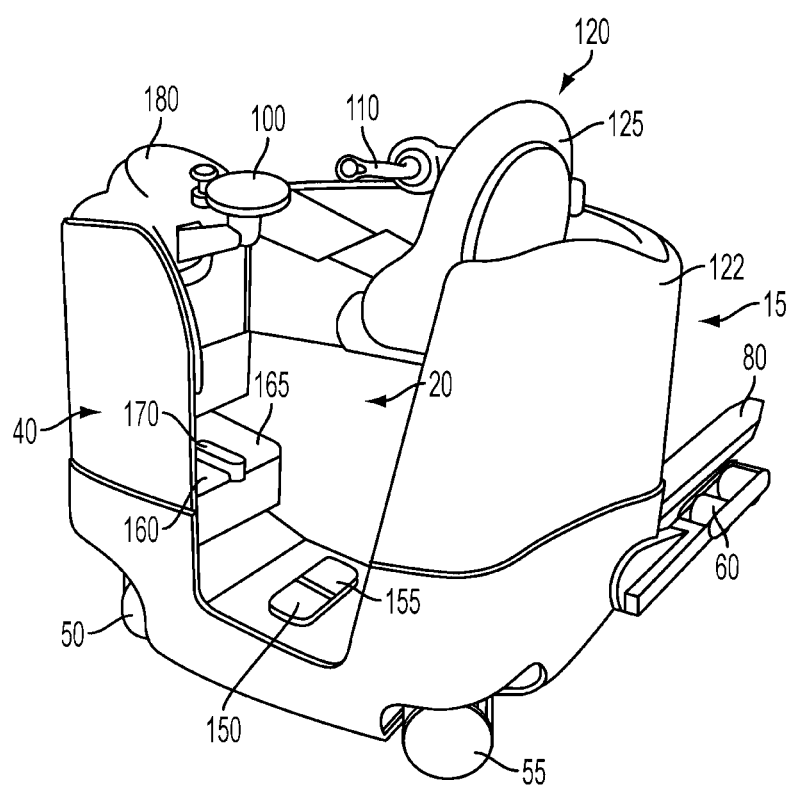
FIG. 3 is a perspective view of an operator's compartment in the main body of the truck illustrated in FIG. 1.

FIGS. 1-3 show a rider reach fork lift truck or vehicle 10 that includes a power unit or main body 15 comprising an operator's compartment 20, a battery compartment 30, and a motor compartment 40. A battery 35, see FIG. 2, in the battery compartment 30 supplies power to a traction motor 42, which is located in the motor compartment 40 and connected to a steerable wheel 50 (also referred to herein as a "driven wheel") located at the left rear corner of the main body 15. Attached to the traction motor 42 is a service or friction brake 44 for applying a braking torque to a drive shaft of the traction motor 42 to effect braking of the motor 42 and the driven wheel 50.

The brake 44 may comprise a variable braking force electric brake comprising two sets of springs (not shown) for urging a non-magnetic brake support plate (not shown) and associated brake pads (not shown) against a rotor (not shown). Three levels of braking force may be provided with brake release and level of braking force being controlled via electromagnetic elements. The amount of braking torque applied by the service brake 44 may comprise a constant first torque amount, a constant second torque amount greater than the first torque amount or a constant third torque amount greater than the first or the second torque amount. A similar type of friction brake is described in U.S. Pat. No. 5,057,728, the entirety of which is incorporated by reference herein. U.S. Pat. No. 5,509,509 is also incorporated in its entirety herein. A roller bearing encoder 42A (also referred to herein as a "first sensor") is incorporated into the motor 42 for sensing the speed and direction of rotation of the traction motor 42, see FIGS. 2 and 4. The speed signal generated by the encoder 42A is indicative of the speed of rotation of the driven wheel 50. A caster wheel 55 is mounted at the right rear corner of the power unit 15. A pair of outriggers 60 support the front end of the truck 10.

Figure 4:
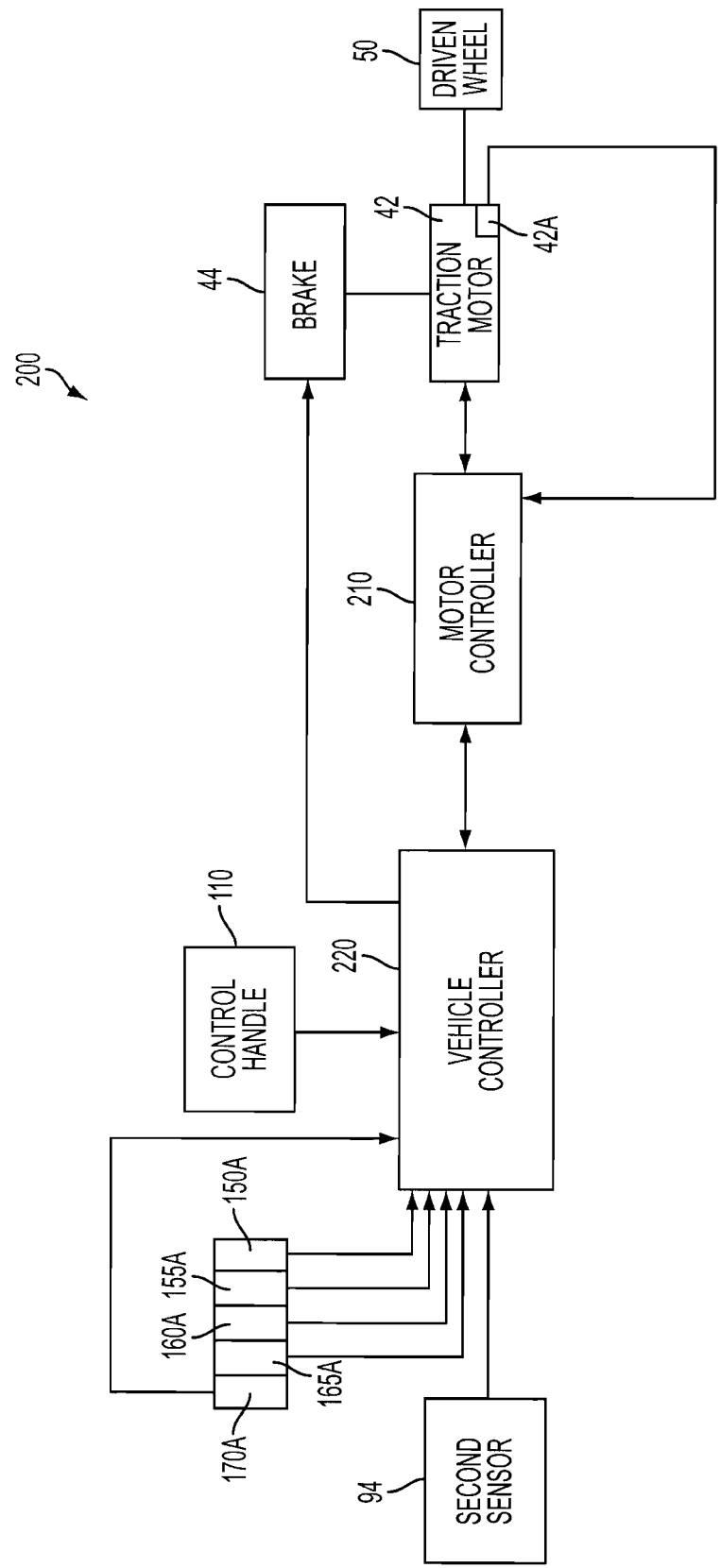
FIG. 4 is a block diagram of a control apparatus forming part of the vehicle illustrated in FIG. 1.

A mast assembly 70, mounted to the front of the main body 15 of the truck 10, supports an overhead guard 75. A pair of forks 80 are carried on a fork carriage mechanism 85 which is coupled to the mast assembly 70. The mast assembly 70 may comprise one or more mast weldments movable relative to a stationary mast weldment, see U.S. Pat. Nos. 5,586,620 and 5,995,001, the entirety of these patents are incorporated by reference herein. One or more hydraulic lift cylinders (not shown) are operated by a control handle 110 to lift the movable mast weldments and the fork carriage mechanism 85 relative to the stationary mast weldment. A pressure sensor 94 (also referred to herein as a "second sensor"), see FIG. 4, is coupled to the one or more hydraulic lift cylinders for sensing the fluid pressure within the cylinders. The pressure sensor 94 generates a signal indicative of the load mass on the forks 80. In addition to a reach mechanism 92 which allows the forks 80 to be extended forward of the mast assembly 70, the fork carriage mechanism 85 may include a side shift mechanism (not shown) to permit the forks 80 to be moved from side to side relative to the mast assembly 70, and a tilt mechanism comprising a hydraulic cylinder 200 located between the forks 80 and the fork carriage 85 to permit the forks 80 to be tilted relative to horizontal.

In the operator's compartment 20 are mounted a steering tiller 100, see FIG. 3, for controlling steering of the truck 10 and the control handle 110 for controlling the speed of travel and the forward and reverse direction of the truck 10 as well as fork height, fork extension, and fork tilt and side-shift.

Also located within the operator's compartment 20 may be a seat assembly 120 which is attached to the right side 122 of the power unit 15, as shown. The seat assembly 120 includes a back rest 125, a seat 130, and a shelf 135. The seat assembly 120 is vertically adjustable for operator comfort. An armrest 140 may be supported on the seat assembly 120 for movement therewith.

On the floor of the operator's compartment 20 are two foot pedals 150 and 155, see FIG. 3. The left-hand pedal 150 operates an electric switch 150A to control braking of the truck 10 while the right-hand pedal 155 operates a switch 155A indicating the presence of the operator's foot thereon. Also located within the operator's compartment are three additional pedals: a pedal 160 which corresponds to the pedal 150 and is coupled to a switch 160A; a pedal 165 which corresponds to the pedal 155 and is coupled to a switch 165A; and, a pedal 170 which is an additional brake pedal coupled to a switch 170A.

The operator must have one foot on and depress the pedal 150 or the pedal 160 in order for the truck 10 to move; otherwise, the truck's brakes will be fully applied. The operator must also depress either pedal 155 or pedal 165 in order for the truck 10 to move, if it is stopped. If the truck 10 is moving, removal of the foot from the pedal 155 or the pedal 165 will cause the truck 10 to coast. The switches 155A and 165A controlled by pedals 155 and 165 are known as "presence" or "cut back" switches. Pedal 170 is an axillary brake switch. Anytime the operator depresses pedal 170, the brakes of the truck 10 will be immediately applied.

An operator's console 180 provides the operator with information regarding the status of the battery voltage and may provide additional information including indications regarding the fork height and the mass of the load on the forks 80.

The truck 10 includes two braking modes. In the first mode, commonly referred as "plugging," movement of the control handle 110 in the direction opposite to the current direction of travel of the truck 10 is recognized as a plugging request and results in braking by action of the traction motor 42. During plugging, power is applied to the traction motor 42 tending to drive the motor 42 in a direction opposite to that in which the truck 10 is moving, although the motor 42 still rotates in the direction of truck movement. Until the truck 10 slows to zero speed, the motor 42 acts as a dynamic brake. Ultimately, the truck 10 slows to a stop and begins to move in the reverse direction, at which time the plugging action ceases. It should be noted that plugging, as herein defined, may utilize the principles of regenerative braking. In the second mode, commonly known as service braking, the operator either removes his/her foot from the pedal 150 or the pedal 160, or depresses the pedal 170. In response to the service brake request, the braking effort is allocated between the service brake 44 and the traction motor 42, wherein use of the traction motor 42 is maximized so as to reduce wear on the service brake 44.

The block diagram of FIG. 4 shows control apparatus 200 located within the main body 15 comprising a motor controller 210 and a vehicle controller 220. The motor controller 210 is coupled to the traction motor 42 and the first sensor 42A. The vehicle controller 220 is coupled to the motor controller 210, the friction brake 44, the second sensor 94, the control handle 110 and the switches 150A, 155A, 160A, 165A and 170A.

As noted above, an operator can control the speed of travel and the forward and reverse direction of the truck 10 via the control handle 110. As also noted above, an operator can generate a plugging command via the control handle 110.

When an operator wishes to command movement of the truck 10 in a forward direction, i.e., a forks first direction, the operator pushes the control handle 110 in a forward direction, i.e., away from the operator, wherein the amount of movement of the handle 110 corresponds to an amount of positive torque to be applied to the driven wheel 50 so as to increase the truck's speed in the forks first direction. If the operator wishes to command movement of the truck 10 in a reverse direction, i.e., in a power unit first direction, the operator pulls the control handle 110 in a reverse direction, i.e., towards the operator, wherein the amount of movement of the control handle 110 corresponds to an amount of negative torque to be applied to the driven wheel 50 so as to increase the truck's speed (magnitude) in the power unit first direction. Based on the direction and amount of movement of the control handle 110, the control handle 110 generates a direction and magnitude signal to the vehicle controller 220.

If the truck 10 is moving in the forward or forks first direction and the operator wishes to effect braking via a plugging operation, i.e., via action of the traction motor 42, the control handle 110 is moved in the reverse direction toward the operator, wherein the amount of movement of the control handle 110 corresponds to an amount of negative torque to be applied to the driven wheel 50 to brake the truck 10. If the truck 10 is moving in the reverse or power unit first direction and the operator wishes to effect braking via a plugging operation, i.e., via action of the traction motor 42, the control handle 110 is moved in a forward direction away from the operator, wherein the amount of movement of the control handle 110 corresponds to a desired positive torque to be applied to the driven wheel 50 to brake the truck 10. Again, based on the direction and amount of movement of the control handle 110, the control handle 110 generates a direction and magnitude signal to the vehicle controller 220.

If the truck 10 is moving and the operator either releases pedal 150 (or pedal 160 if pedal 160 is being used) or the operator depresses brake pedal 170, a braking signal is generated to the vehicle controller 220 by a corresponding switch 150A, switch 160A or switch 170A. As noted above, the vehicle controller 220 maximizes use of the traction motor 42 to effect dynamic braking so as to minimize use of the service brake 44. See U.S. Pat. No. 6,236,927, the entire disclosure of which is incorporated herein by reference.

Based on signals from the control handle 110, the switches 150A, 155A, 160A, 165A and 170A, the second sensor 94 and a speed signal from the motor controller 210, the vehicle controller 220 generates a desired traction control signal to the motor controller 210. In response to receiving the traction control signal from the vehicle controller 220, the motor controller 210 generates a motor drive signal to the traction motor 42 corresponding to a desired positive or negative torque to be applied to the driven wheel 50. A positive torque applied to the driven wheel 50 is intended to effect a force on the truck 10 in a forks first direction to either increase the speed of the truck 10 in the forks first direction or to brake the truck 10 when moving in the power unit first direction. A negative torque applied to the driven wheel 50 is intended to effect a force on the truck 10 in a power unit first direction to either increase the speed of the truck 10 in the power unit first direction or to brake the truck 10 when moving in the forks first direction.

In the illustrated embodiment, the desired traction control signal generated by the vehicle controller 220 comprises a desired torque control signal corresponding to a desired torque, either positive or negative, to be applied by the traction motor 42 to the driven wheel 50. It is contemplated that the desired traction control signal generated by the vehicle controller 220 may comprise a desired speed control signal commanding the motor controller 210 to generate a motor drive signal to the traction motor 210 to drive the driven wheel 50 at a desired speed.

As noted above, when an operator wishes to command movement of the truck 10 in a forward direction, i.e., a forks first direction, the operator pushes the control handle 110 in the forward direction a desired amount. Further, the operator must have already depressed either the pedal 155 or the pedal 165, indicating that the operator is present in the operator's compartment 20, and either pedal 150 or 160, to deactivate service braking. In response, the vehicle controller 220 generates an appropriate traction control signal to the motor controller 210 to generate a desired positive torque to the driven wheel. As also noted above, when an operator wishes to command movement of the truck 10 in a reverse direction, i.e., in a power unit first direction, the operator pulls the control handle 110 in the reverse direction a desired amount. Further, the operator must have already depressed either the pedal 155 or the pedal 165, indicating that the operator is present in the operator's compartment 20, and either the pedal 150 or the pedal 160, to deactivate braking. In response, the vehicle controller 220 generates an appropriate traction control signal to the motor controller 210 corresponding to a desired negative torque to the driven wheel 50.

If the truck 10 is moving in either the forward or the reverse direction and the operator wishes to effect braking via a plugging operation, i.e., via action of the traction motor 42, the control handle 110 is moved in a direction opposite to the vehicle travel direction an amount corresponding to a desired braking torque to be applied to the driven wheel 50 to brake the truck 10. In response, the vehicle controller 220 generates an appropriate traction control signal to the motor controller 210 corresponding to a desired braking torque to be applied to effect plugging braking.

If the truck 10 is moving and the operator either releases the pedal 150 or the pedal 160 or the operator depresses the brake pedal 170, a corresponding service braking signal is generated to the vehicle controller 220 by a corresponding one of switch 150A, switch 160A and switch 170A. In response, the vehicle controller 220 determines the total braking torque required to brake the vehicle 10, subtracts the maximum braking torque capacity of the traction motor 42 from the total braking torque to determine a minimum amount of braking torque to be applied by the service brake 44. The braking torque to be applied by the service brake 44 is selected from one of the first, second and third torque amounts noted above, wherein the selected torque amount is equal to or greater than the service brake braking torque amount determined when subtracting the maximum braking torque capacity of the traction motor 42 from the total braking torque required to brake the truck 10. The vehicle controller 220 then generates an appropriate control signal to the service brake 44 instructing the service brake 44 to apply the selected level of mechanical braking torque and further generates an appropriate traction control signal to the motor controller 210 to generate a traction motor braking torque by the traction motor 42, which traction motor braking torque is equal to the total braking torque required to brake the truck 10 minus the selected braking torque of the service brake 44.

Slip or relative motion may occur between the driven wheel 50 and a supporting surface, e.g., a floor. A "percent slip" may be define as a ratio of a difference between a peripheral speed $S_{PER}$ of the driven wheel 50 and the truck's speed (ground speed) $S_G$ relative to the truck's speed (ground speed) $S_G$.

% Slip=$(S_{PER}-S_G)/S_G$

It is believed that a maximum tractive force of a tire on hard surfaces is usually reached between about 15% and 20% slip.

Figure 7:
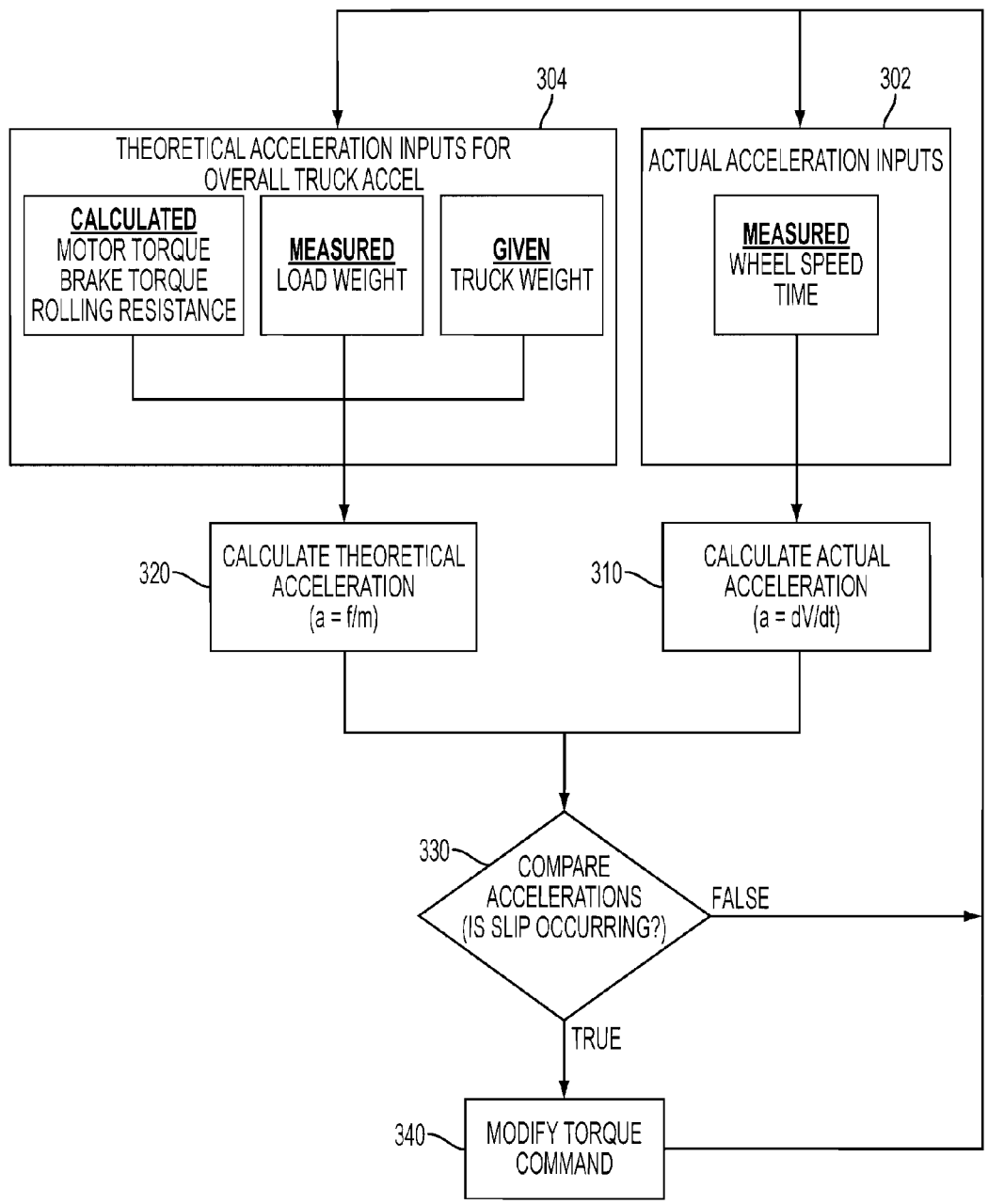
FIG. 7 illustrates steps performed by the vehicle illustrated in FIG. 1.

In accordance with a first slip estimation process of the present invention, the vehicle controller 220 calculates actual linear acceleration of the driven wheel 50, see step 310 in FIG. 7, calculates theoretical linear acceleration of the overall truck 10, see step 320 in FIG. 7, and compares the calculated acceleration of the driven wheel 50 to the calculated acceleration of the truck 10, see step 330 in FIG. 7. Based on that comparison, a determination is made as to whether unacceptable slip is occurring between the driven wheel 50 and the supporting surface. Acceleration of the driven wheel 50 in the forks first direction so as to increase the speed of the driven wheel 50 is considered to be positive acceleration; acceleration of the driven wheel 50 in the power unit first direction so as to increase the speed of the driven wheel 50 is considered to be negative acceleration; acceleration of the driven wheel 50 so as to decrease the speed of the driven wheel 50 when the truck 10 is moving in the forks first direction is considered to be negative acceleration; and acceleration of the driven wheel 50 so as to decrease the speed of the driven wheel 50 when the truck 10 is moving in the power unit first direction is considered to be positive acceleration. Acceleration of the truck 10 in the forks first direction so as to increase the speed of the truck 10 is considered to be positive acceleration; acceleration of the truck 10 in the power unit first direction so as to increase the speed of the truck 10 is considered to be negative acceleration; acceleration of the truck 10 when the truck 10 is moving in the forks first direction so as to decrease the speed of the truck 10 is considered to be negative acceleration; and acceleration of the truck 10 so as to decrease the speed of the truck 10 when the truck 10 is moving in the power unit first direction is considered to be positive acceleration.

Because the acceleration of the overall truck is estimated or calculated in the illustrated embodiment, a separate sensor for measuring overall truck velocity, i.e., ground speed, or overall truck acceleration is not required, which provides a cost savings benefit.

Figure 5:
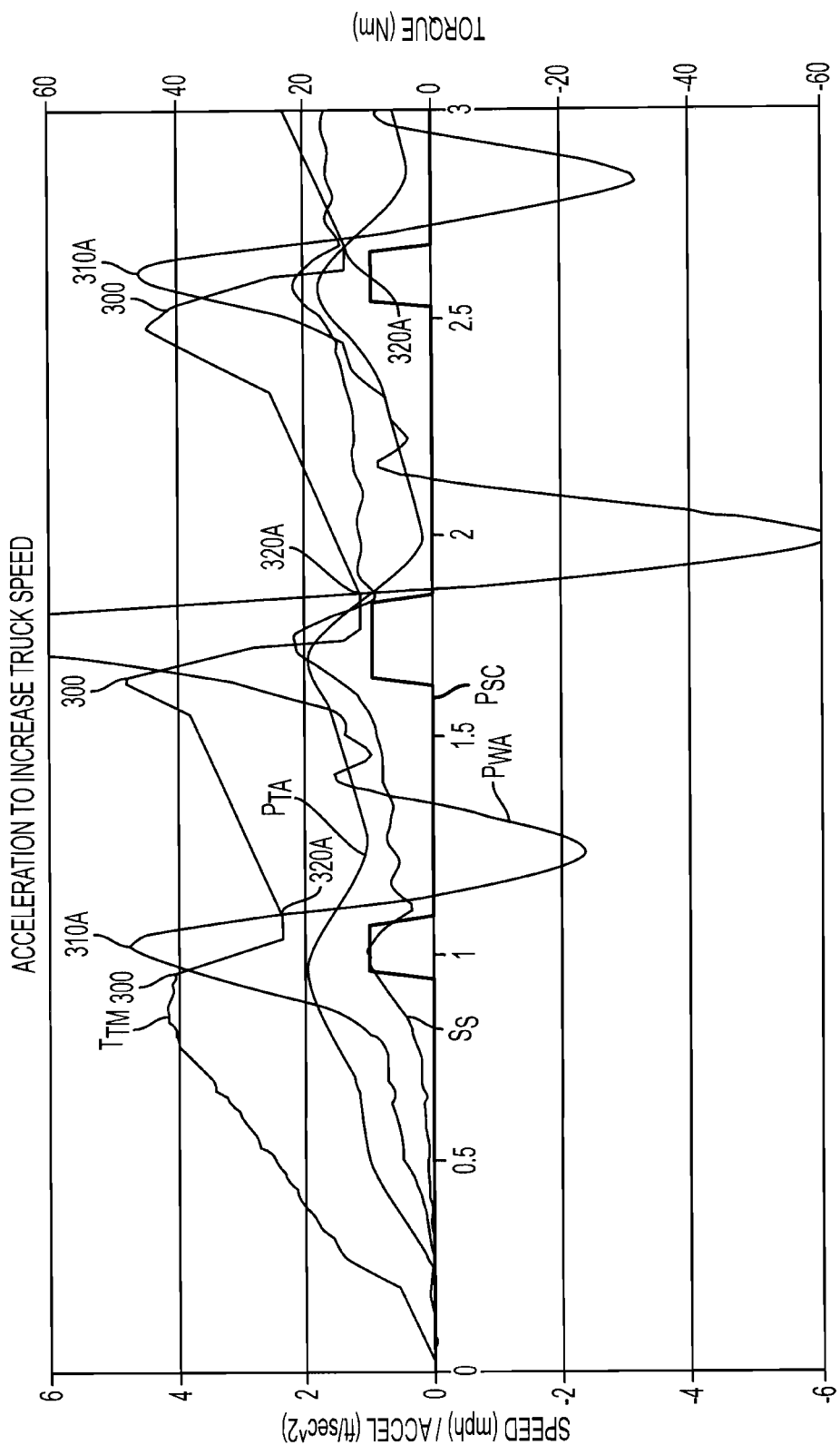
FIG. 5 illustrates example data plots corresponding to a vehicle being positively accelerated in a forks first direction.
Figure 6:
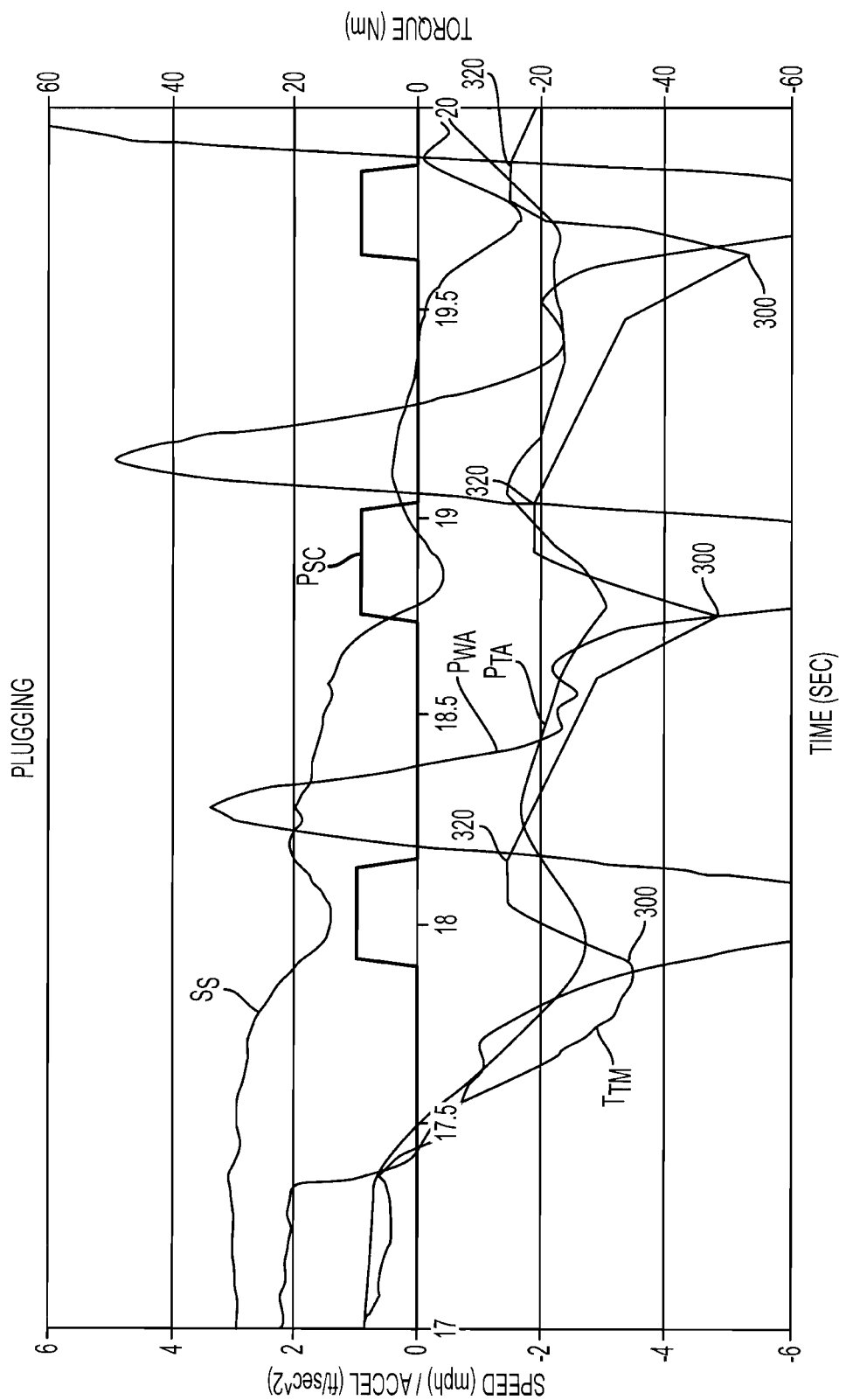
FIG. 6 illustrates example data plots corresponding to a vehicle being operated in the forks first direction and braked.

Acceleration of the driven wheel 50 is calculated using changes in the speed signal generated by the encoder 42A over time, i.e., $\Delta V/\Delta t$, see steps 302 and 310 in FIG. 7. Example speed signals $S_S$ are illustrated in FIGS. 5 and 6. In the illustrated embodiment, the speed signal is generated by the encoder 42A to the motor controller 210, which, in turn, generates a corresponding speed signal to the vehicle controller 220. It is contemplated that the speed signal could be provided by the encoder 42A directly to the vehicle controller 220.

In the illustrated embodiment, the vehicle controller 220 samples the speed signal every predefined time period or "tick." These samples are cascaded into a memory in the vehicle controller 220 until a total of a predetermined number of samples are stored in the memory. Accordingly, samples are stored in the memory representing driven wheel speed in predefined time period intervals for a total of a predetermined number of such samples. If the predetermined number of memory locations are full, the oldest sample is replaced with a new speed signal sample. The calculated driven wheel acceleration is calculated from the samples stored in the memory by using a conventional linear regression equation to establish a least squares fit of the samples of the driven wheel speed stored in the memory plotted against time. Accordingly, a linear plot of driven wheel speed against time is achieved. Driven wheel acceleration, including whether the acceleration is positive or negative, is calculated by calculating the slope of the line generated by the linear regression, i.e., $\Delta V/\Delta t$. Example plots $P_{WA}$ of driven wheel acceleration are shown in FIGS. 5 and 6.

Acceleration of the truck 10 is calculated from the following information: torque applied by the traction motor 42 to the driven wheel 50, the mass of the truck 10, the mass of any load on the forks 80, truck roll resistance, and braking torque applied by the friction brake 44, see steps 304 and 320 in FIG. 7. As noted above, the traction control signal generated by the vehicle controller 220 may define a desired torque to be applied by the traction motor 42 to the driven wheel 50. The vehicle controller 220 may use the traction control signal defining a desired torque when estimating the acceleration of the truck 10. In accordance with a further embodiment of the present invention, the motor controller 210 may estimate torque applied by the traction motor 42 to the driven wheel 50 and generate a corresponding estimated torque signal to the vehicle controller 220. The vehicle controller 220 may use the estimated torque signal from the motor controller 210 to determine the torque applied by the traction motor 42 when calculating the acceleration of the truck 10. It is further contemplated that torque applied by the traction motor 42 may be measured via a sensor (not shown), wherein a signal corresponding to the measured torque may be provided by the sensor to the vehicle controller 220 for use by the vehicle controller 220 when calculating the acceleration of the truck 10.

The mass of the truck 10 is a fixed value stored in memory in the vehicle controller 220. The vehicle roll resistance corresponds to air resistance, tire deformation and bearing and gear drag. In the illustrated embodiment, the vehicle roll resistance is calculated by the vehicle controller 220 to be equal to 2% of the summation of the fork load mass and the mass of the truck 10. The vehicle controller 220 can determine the mass of any load on the forks 80 from readings taken from the signal generated by the pressure sensor 94. The vehicle controller 220 knows the amount of torque applied by the service brake 44 to the traction motor drive shaft, and, hence, the driven wheel 50, wherein the torque applied equals zero torque (no service braking being commanded) or one of first, second and third constant service brake torque amounts (when service braking is being commanded).

As noted above, acceleration of the overall truck 10 is calculated from the following information: torque applied by the traction motor 42 to the driven wheel 50, the mass of the truck 10, the mass of any load on the forks 80, truck roll resistance, and braking torque applied by the friction brake 44, see steps 304 and 320 in FIG. 7. More specifically, the vehicle controller 220 determines a total force, including whether the total force is positive or negative, acting on the truck 10 based on the torque, either positive (to apply a force in the forks first direction) or negative (to apply a force in the power unit first direction), applied by the traction motor 42 to the driven wheel 50, truck roll resistance (negative when the truck 10 is moving in the forks first direction and positive when the truck 10 is moving in the power unit first direction), and braking torque applied by the friction brake 44 (positive when the truck 10 is moving in the power unit first direction and negative when the truck 10 is moving in the forks first direction), see steps 304 and 320 in FIG. 7. In the illustrated embodiment, the vehicle controller 220 determines total force every predefined time period. Values of total force are cascaded into a memory in the vehicle controller 220 until a predetermined number of values are stored in the memory. If the predetermined number of memory locations are full, the oldest total force value is replaced with a new total force value. Every predefined time period, the vehicle controller 220 determines an average of the total force from the predetermined number of values stored in the memory, divides the average total force by a summation of the truck mass and fork load mass, and determines a calculated acceleration for the overall truck 10, including whether the truck acceleration is positive or negative:

Acceleration=Force/mass.

The calculated acceleration of the truck 10 may differ from the calculated acceleration of the driven wheel 50 due to slip. Example plots $P_{TA}$ of calculated truck acceleration are shown in FIGS. 5 and 6.

When using the first slip estimation process, the vehicle controller 220 does not calculate a percent slip value. Instead, the vehicle controller 220 uses values (1) and (2), set out below, to compare the calculated driven wheel acceleration with the calculated overall truck acceleration to determine if unacceptable slip is occurring at the driven wheel 50. More specifically, the vehicle controller 220 determines that slip is unacceptable at the driven wheel 50 if the following Conditions I and II are met: Condition I) the calculated acceleration magnitude (i.e., absolute value) of the driven wheel 50 is greater than either of value (1) or value (2) and; Condition II) based on calculations, both the driven wheel 50 and the truck 10 are being positively accelerated or both the driven wheel 50 and the truck 10 are being negatively accelerated. Condition II is not met if the driven wheel has a calculated positive acceleration while the truck has a calculated negative acceleration or the driven wheel has a calculated negative acceleration while the truck has a calculated positive acceleration. Values (1) and (2) are calculated from the following:

((the estimated acceleration magnitude of the truck)× $A$)+$B$=value (1)

(the estimated acceleration magnitude of the truck)+ $C$=value (2)

wherein A, B and C are constants.

In the examples illustrated in FIGS. 5 and 6, A=1.25, B=1 and C=2. Constants A, B and C may be defined so that when the calculated acceleration magnitude of the driven wheel 50 is greater than at least one of a value (1) or value (2), percent slip is unacceptable, i.e., greater than about 20% slip.

If either condition I or condition II is not met or both conditions I and II are not met, then the vehicle controller determines that slip is acceptable or no slip is occurring.

In FIGS. 5 and 6, the following example data plots are provided: plots of the speed signal $S_S$ generated by the encoder 42A; plots $P_{WA}$ of calculated driven wheel acceleration; plots $P_{TA}$ of calculated truck acceleration; and plots $T_{TM}$ of traction motor torque. The data plots set out in FIG. 5 correspond to the truck 10 being positively accelerated (positive torque being applied) in the forks first direction so as to increase its speed. The data plots set out in FIG. 6 correspond to the truck 10 being driven in the forks first direction and being braked (negative torque being applied) via a plugging braking operation.

Further provided in FIGS. 5 and 6 are slip vs. time plots $P_{SC}$. When slip is equal to 1, the calculated acceleration magnitude of the driven wheel 50 is greater than at least one of value (1) or value (2) and Condition II set out above is met.

Hence, slip at the driven wheel 50 is presumed to be unacceptable. If the vehicle controller 220 determines that slip is unacceptable, it reduces the value of the desired traction control signal to the motor controller 210 so as to reduce the torque (magnitude) applied by the traction motor 42 to the driven wheel 50. In FIGS. 5 and 6, torque (magnitude) begins to be reduced at points 300.

In the illustrated embodiment, the vehicle controller 220 reduces the desired traction control signal in magnitude at a predefined rate until the calculated acceleration of the one driven wheel 50 is no longer increasing in magnitude, see points 310A in FIG. 5. More specifically, the traction control signal magnitude is reduced every predefined time period by multiplying the previous traction control signal value by 0.9. The traction control signal is reduced in this manner until the calculated acceleration of the one driven wheel 50 is no longer increasing in magnitude. The vehicle controller 220 maintains the desired traction control signal at a constant value after the vehicle controller 220 determines that the calculated acceleration of the driven wheel 50 is no longer increasing in magnitude. This constant value is maintained until slip is determined to be acceptable.

As noted above, the vehicle controller 220 presumes that slip is acceptable or no slip is occurring if condition I is not met, condition II is not met or both conditions I and II are not met. The vehicle controller 220 increases the desired traction control signal in magnitude if the vehicle controller 220 determines that unacceptable slip is not occurring, i.e., slip is acceptable or no slip is occurring, at the driven wheel 50, see points 320A in FIGS. 5 and 6 where the magnitude of torque generated by the traction motor 42 begins to increase. In the illustrated embodiment, the torque is increased in magnitude during positive acceleration by 0.5 Nm every predefined time period for a total of a predetermined number of time intervals. After the predetermined number of time intervals, torque is increased in magnitude at a normal rate. Further in the illustrated embodiment, the torque is increased in magnitude during braking by 0.5 Nm every predefined time period for a total of a predetermined number of time intervals. After the predetermined number of time intervals, torque is increased in magnitude at a normal rate.

While the present invention has been described in the illustrated embodiment as forming part of a rider reach fork lift truck or vehicle, it is contemplated that the present invention may be incorporated into any vehicle comprising a traction motor for driving a wheel of the vehicle, and a speed sensor generating a signal indicative of a speed of the driven wheel. For example, any materials handling vehicle may, in accordance with the present invention, comprise a traction motor, a speed sensor for generating a speed signal indicative of a speed of a driven wheel and control apparatus for calculating acceleration of the driven wheel using changes in the speed signal over time and calculating an acceleration of the vehicle using torque applied by the traction motor and a mass of the vehicle. The control apparatus may further estimate if unacceptable slip is occurring at the driven wheel based on a comparison of the calculated acceleration of the wheel and the calculated acceleration of the vehicle. It is further contemplated that the present invention may be incorporated into a materials handling vehicle, such as sit-down counterbalanced forklift truck, where braking is controlled via a pedal capable of being depressed to activate braking, vehicle acceleration to increase vehicle speed is activated via an accelerator pedal and plugging is controlled via a wand on a steer column or a rocker or toggle switch on a cowl panel.

It is further contemplated that a vehicle constructed in accordance with the present invention may include two or more traction motors. For example, a vehicle may comprise a first traction motor for driving a first wheel, a first speed sensor for generating a first speed signal indicative of a speed of the first driven wheel, a second traction motor for driving a second wheel, a second speed sensor for generating a second speed signal indicative of a speed of the second driven wheel, and control apparatus for calculating acceleration of each of the first and second driven wheels using changes in the first and second speed signals over time and calculating an acceleration of the vehicle using forces acting on the vehicle such as torque applied by the first and second traction motors, and a mass of the vehicle. The control apparatus may further estimate if unacceptable slip is occurring at the first driven wheel based on a comparison of the calculated acceleration of the first wheel and the calculated acceleration of the vehicle and also estimate if unacceptable slip is occurring at the second driven wheel based on a comparison of the calculated acceleration of the second wheel and the calculated acceleration of the vehicle. In this embodiment, slip may be occurring at one of the first and second driven wheels while not occurring at the other of the first and second driven wheels.

It is still further contemplated that once a control apparatus determines that unacceptable slip is occurring at a driven wheel, the control apparatus may apply and control the torque of a brake, such as a hydraulically or electrically controlled brake associated with the driven wheel, so as to reduce slip. Further, the brake may be applied either alone or concurrently with reducing the value of a traction control signal to a corresponding traction motor driving the driven wheel. When the brake is applied, it may be pulsed so as to reduce slip.

Figure 8:
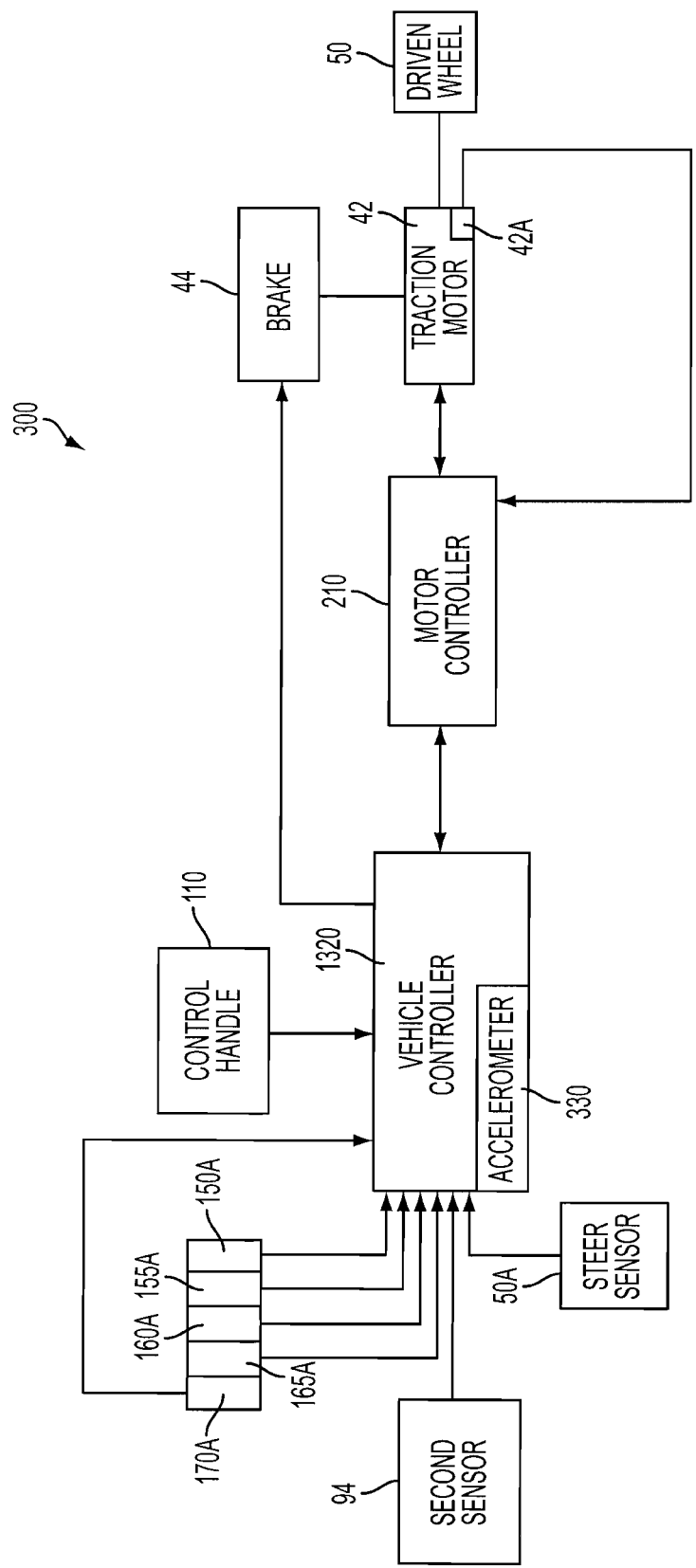
FIG. 8 is a block diagram of a control apparatus constructed in accordance with a second embodiment of the present invention.

Referring now to FIG. 8, control apparatus 300 is illustrated configured in accordance with a second embodiment of the present invention, where elements in the FIG. 8 embodiment which are equivalent to elements in the FIG. 4 embodiment are referenced by the same reference numerals. In this embodiment, the vehicle controller 1320 may determine if unacceptable slip is occurring between the driven wheel 50 and the supporting surface using a second slip estimation process by comparing the measured linear velocity of the driven wheel 60 with a calculated linear velocity of the overall vehicle 10 or main body 15. As will be discussed further below, this second slip estimation process may be used alone or in combination with the first slip-estimation process set out above.

A velocity signal (magnitude and direction) is generated by the encoder 42A to the motor controller 210, which, in turn, generates a corresponding velocity signal (magnitude and direction) to the vehicle controller 1320. It is contemplated that the velocity signal could be provided by the encoder 42A directly to the vehicle controller 1320. By sampling the velocity signal, the vehicle controller 1320 knows the actual/measured linear velocity of the driven wheel 50.

The vehicle controller 1320 may start a timer so as to initiate the second slip estimation process when certain truck conditions are met indicating that it is unlikely that the driven wheel 50 is slipping, such as when the magnitude of the traction motor torque is below a predefined value, e.g., 5 Nm, and a steer angle of the steerable wheel 50, as sensed by a steer sensor 50A associated with the steerable wheel 50, see FIG. 7, is less than a predefined angle, e.g., 20 degrees. If these conditions are met, the vehicle controller 1320 may set the timer for a predetermined time period, e.g., four seconds, and start the second slip estimation process during that time period. This time period may be extended or the timer may be reset as will be described below. The timer is used so as to enhance the accuracy of the second slip estimation process.

At the beginning of the predetermined time period, the vehicle controller 1320 presumes that the linear velocity of the overall vehicle 10 is equal to the linear velocity of the driven wheel 50. Hence, at the beginning of the predetermined time period, an initial linear velocity of the overall vehicle 10 is set equal to the driven wheel linear velocity at that time. For every predefined time period or "tick" during the remainder of the predetermined time period, the vehicle controller 1320 estimates a change in vehicle linear velocity and adds this vehicle linear velocity change to the vehicle linear velocity (either the initial linear velocity or a linear velocity updated during a prior tick) to determine an updated vehicle linear velocity.

An accelerometer 330, see FIG. 8, is provided as part of the vehicle controller 1320 and senses linear acceleration (magnitude and direction) of the overall vehicle 10. The accelerometer 330 generates a vehicle acceleration signal (magnitude and direction) representative of the sensed linear acceleration of the overall vehicle 10. In the illustrated embodiment, the vehicle controller 1320 samples the acceleration signal (units may equal ft/s$^2$) at every predefined time period or "tick." Each predefined time period or tick may comprise 0.016 second or any other time period. The controller 1320 multiplies each new acceleration signal value by the tick time period, e.g., 0.016 second, to get a vehicle linear velocity change (magnitude and direction) that occurred during that time period or tick. A first vehicle linear velocity change is added to the initial vehicle linear velocity to get a first updated vehicle linear velocity and, thereafter, each subsequent linear velocity change is added to the prior updated vehicle linear velocity to get a new updated vehicle linear velocity.

When the truck 10 is moving in the forks first direction, it has a positive velocity and when the truck 10 is moving in the power unit first direction, it has a negative velocity. When the driven wheel 50 is rotating in the forks first direction, it has a positive linear velocity and when the driven wheel 50 is rotated in the power unit first direction, it has a negative linear velocity.

As noted above, a positive torque applied to the driven wheel 50 by the traction motor 42 is intended to effect a force on the truck 10 in a forks first direction to either increase the speed of the truck 10 in the forks first direction or to brake the truck 10 when moving in the power unit first direction. A negative torque applied to the driven wheel 50 by the traction motor 42 is intended to effect a force on the truck 10 in a power unit first direction to either increase the speed of the truck 10 in the power unit first direction or to brake the truck 10 when moving in the forks first direction.

When implementing the second slip estimation process, the vehicle controller 1320 does not calculate a percent slip value. Instead, the vehicle controller 1320 compares the initial or updated overall vehicle linear velocity to the driven wheel linear velocity and determines if driven wheel slip is unacceptable based on that comparison. More specifically, if:

1) a positive torque is being applied to the driven wheel 50 by the traction motor 42, and 2) the measured linear velocity (miles/hour) of the driven wheel 50−the calculated linear velocity (miles/hour) of the vehicle 10>a predefined value, e.g., 1 (mile/hour), wherein this difference in velocity is defined as a first delta slip speed, then driven wheel slip is presumed to be unacceptable.

Alternatively, if:

1) a negative torque is being applied to the driven wheel 50 by the traction motor 42, and 2) the calculated linear velocity (miles/hour) of the vehicle 10−the measured linear velocity (miles/hour) of the driven wheel 50>a predefined value, e.g., 1 (mile/hour), wherein this difference in velocity is defined as a second delta slip speed, then driven wheel slip is presumed to be unacceptable.

Figure 9:
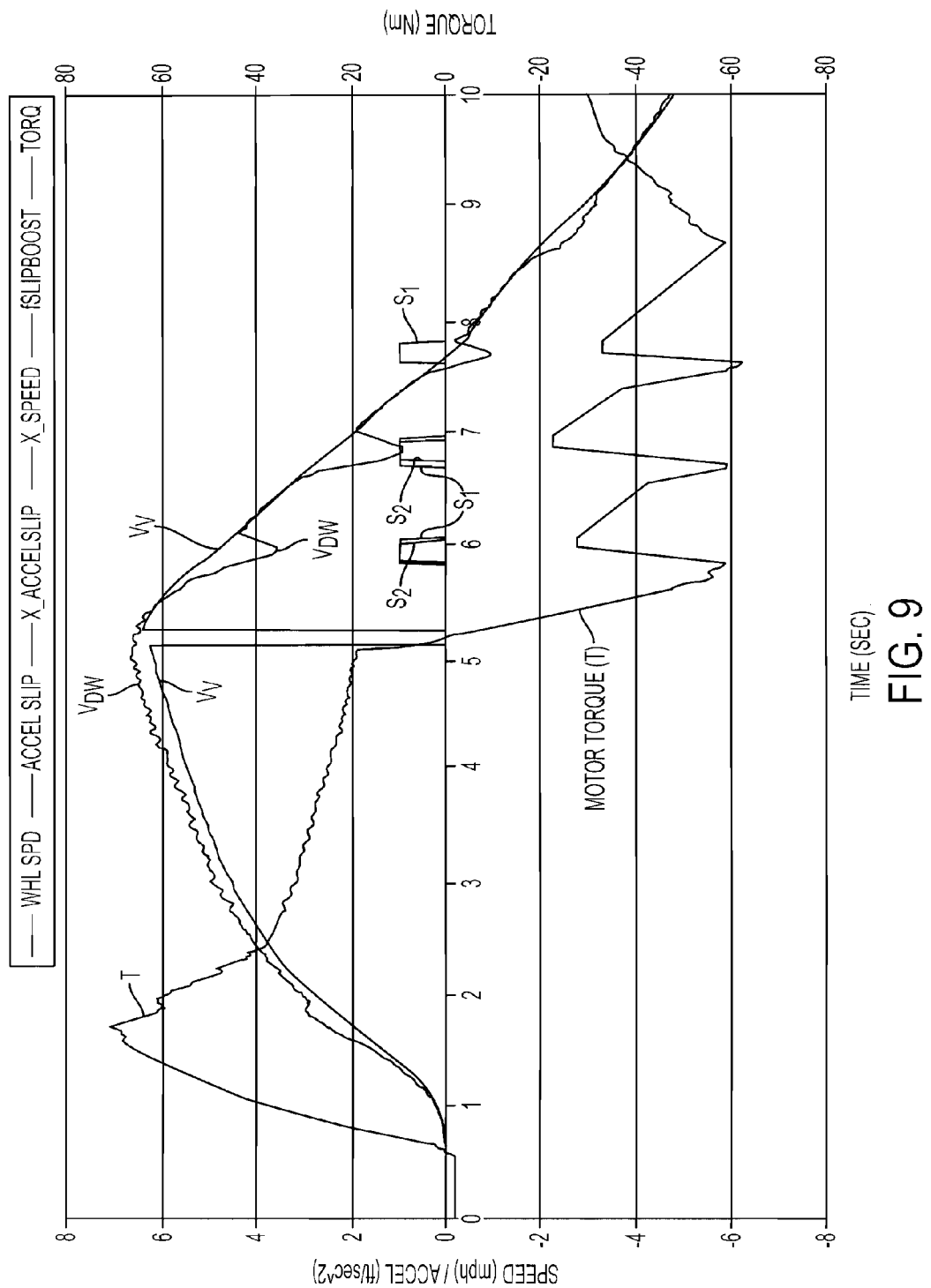
FIG. 9 illustrates further example data plots.

In FIG. 9, the following example data plots are provided: a plot of a traction motor torque T; a plot of measured driven wheel velocity $V_{DW}$; a plot of estimated overall vehicle linear velocity $V_V$; a first plot of slip vs time $S_1$ corresponding to driven wheel slip determined by the first slip-estimation process; and a second slip vs time plot $S_2$ corresponding to driven wheel slip determined by the second slip-estimation process.

In the FIG. 9 example, slip is acceptable up until about 5.8 seconds. At about 5.8 seconds, torque is negative and the calculated linear velocity (miles/hour) of the vehicle 10 minus the measured linear velocity (miles/hour) of the driven wheel 50 is greater than 1 (miles/hour). Hence, slip is presumed to be unacceptable, as indicated by plot $S_2$ having a value of "1" at about 5.8 seconds and remaining unacceptable until just beyond about 6.0 seconds. Slip is also determined to be unacceptable by the vehicle controller 1320 at about 6.6 seconds as plot $S_2$ again has a value of "1" at 6.6 seconds.

The vehicle controller 1320 can run or implement both the first and second slip estimation processes concurrently. In the FIG. 9 example, slip is determined to be unacceptable by both the first and second slip estimation processes at about 5.8 seconds and about 6.6 seconds. However, only the first slip-estimation process determines slip to be unacceptable at about 7.7 seconds.

As noted above, if certain conditions are met, the vehicle controller 1320 may start a timer for a predetermined time period, e.g., four seconds, and implement the second slip estimation process during that time period. Two conditions set out above which should be met before the controller 1320 initiates the timer in the illustrated embodiment include motor torque magnitude being below a predefined value, e.g., 5 Nm, and the steer angle of the steerable wheel 50 being less than a predefined angle, e.g., 20 degrees. A third condition that may be required to be met is that the first and second slip-estimation processes are currently generating a slip value of "0," i.e., slip is currently being found to be acceptable by both processes.

As also noted above, the timer time period may be extended. For example, if, during a current timer time period, the absolute value of the difference between the calculated linear velocity (miles/hour) of the vehicle 10 and the measured linear velocity (miles/hour) of the driven wheel 50<0.25 (miles/hour) and the first and second slip estimation processes are currently generating a slip value of "0," i.e., slip is currently found to be acceptable by both processes, then the timer time period may be set equal to the longer of 2 seconds or the remaining time of the current timer time period.

The timer may be stopped if the second slip-estimation process generates a slip value of "1," i.e., slip is currently determined to be unacceptable, for more than a predefined amount of time, e.g., 0.64 second. It is believed that slip occurring for such a prolonged period of time may occur when the truck 10 is operating on a grade, but without the driven wheel 50 actually slipping. When this occurs, a "grade flag" is set by the vehicle controller 1320 to "true" indicating that the truck 10 may be operating on a grade. The vehicle controller 1320 resets the grade flag to "false" in response to a magnitude of the difference between the calculated driven wheel acceleration (determined during the first slip estimation process) and the calculated overall truck acceleration (also determined during the first slip estimation process) being less than a predefined value indicating that the truck 10 is no longer on a grade equal to or greater than a predetermined grade, e.g., 1.2%. For example, in the illustrated embodiment, the vehicle controller 1320 continuously takes an average of the magnitude of the difference between the calculated driven wheel acceleration and the calculated overall truck acceleration over a 0.64 second time period. When the average difference is less than 0.38 ft/s$^2$, indicating that the truck 10 is operating on a surface having a grade less than 1.2%, the grade flag is reset to "false."

The vehicle controller 1320 may reset the timer and restart the second slip estimation process at any time during operation of the vehicle 10, even if the timer is currently running, if the following conditions are met: motor torque magnitude is below a predefined value, e.g., 5 Nm, the steer angle of the steerable wheel 50 is less than a predefined angle, e.g., 20 degrees, the grade flag is set to "false" and both the first slip-estimation process and the second slip-estimation process are currently generating a slip value of "0," i.e., slip is currently being found to be acceptable. If the timer is not operating, the second slip estimation process defines slip as equal to "0."

The vehicle controller 1320 will decrease traction motor torque via the traction control signal when one or more of the following conditions are met:

1. If the traction motor torque direction and measured driven wheel speed direction are not the same, e.g., the traction motor torque is positive and the driven wheel speed is negative, indicating that the truck speed is being reduced in magnitude, the vehicle controller 1320 will decrease traction motor torque if either of the following conditions is met:
   a. The first slip estimation process is generating a slip value of "1," the magnitude of the calculated overall truck acceleration (determined during the first slip estimation process) is increasing, and either the absolute value of the measure driven wheel speed is less than 2 miles/hour or the timer for the second slip estimation process is not running, or
   b. The second slip estimation process is generating a slip value of "1," and either the first or the second delta slip speed is greater than 2 miles/hour.
2. If the traction motor torque direction and measured driven wheel speed direction are the same, indicating that the truck speed is being increased in magnitude, the vehicle controller 1320 will decrease traction motor torque if either of the following conditions is met:
   a. The first slip estimation process is generating a slip value of "11" and the magnitude of the calculated overall truck acceleration (determined during the first slip estimation process) is increasing, or
   b. The second slip-estimation process is generating a slip value of "1," and either the first or the second delta slip speed is greater than 1 mile/hour.

When the traction control signal magnitude is being reduced, it is reduced every predefined time period by multiplying the previous traction control signal value by 0.9. The traction control signal is reduced in this manner until none of the above conditions 1a, 1b, 2a and 2b are being met. If none of the above conditions 1a, 1b, 2a and 2b are being met (i.e. the traction motor torque is not being reduced in magnitude) and either the first or the second slip estimation process is generating a slip value of "1," the vehicle controller 1320 limits the desired traction control signal to its current value until both the first and second slip estimation processes are generating a slip value of "0".

In certain situations, a change in driven wheel velocity can be very rapid as indicated by either the first or the second delta slip speed being greater than 2 miles/hour, such as when the driven wheel 50 encounters a patch of oil. In such a scenario, the vehicle controller 1320 may immediately reduce torque generated by traction motor 42 to the driven wheel 50 to a very small value or zero for up to a predefined maximum time period, e.g., 0.45 second.

It is further contemplated that a vehicle constructed in accordance with the present invention may include two or more traction motors. For example, a vehicle may comprise a first traction motor for driving a first wheel, a first velocity sensor for generating a first velocity signal indicative of a velocity of the first driven wheel, a second traction motor for driving a second wheel, a second velocity sensor for generating a second velocity signal indicative of a velocity of the second driven wheel, and a sensor for sensing the acceleration of the vehicle and generating a corresponding vehicle acceleration signal. The vehicle controller can control each first and second driven wheel separately using corresponding first and second slip estimation processes.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A vehicle comprising:
   a main body;
   a plurality of wheels coupled to said main body;
   a traction motor associated with said main body and coupled to at least one of said wheels for driving said one wheel;
   control apparatus coupled to said fraction motor and generating a motor drive signal to said traction motor;
   a first sensor for generating a velocity signal indicative of a velocity of said driven wheel;
   a further sensor for sensing an acceleration of said main body and generating a vehicle acceleration signal; and
   said control apparatus determining a measured velocity of said driven wheel from said first sensor signal, calculating a velocity of said vehicle using said vehicle acceleration signal and said measured velocity of said driven wheel and comparing said measured velocity of said driven wheel to said calculated velocity of said vehicle to determine wheel slip status.

2. The vehicle of claim 1, wherein said control apparatus determines said wheel slip status by estimating if unacceptable slip is occurring at said driven wheel based on the comparison of said measured velocity of said driven wheel and said calculated velocity of said vehicle.

3. The vehicle as set out in claim 2, wherein said control apparatus samples said vehicle acceleration signal during each of one or more predefined time periods to determine a new acceleration signal value and calculates a vehicle linear velocity change for each predefined time period by multiplying said new acceleration signal value by said time period.

4. The vehicle as set out in claim 3, wherein said control apparatus defines an initial linear velocity of said vehicle as being equal to a current measured velocity of said driven wheel, adds a first vehicle linear velocity change to said initial linear velocity to get a first updated vehicle linear velocity and, thereafter, adds each subsequent linear velocity change to the prior updated vehicle linear velocity to get a new updated vehicle linear velocity.

5. The vehicle as set out in either claim 2 or claim 4, wherein when a positive torque is being applied to said driven wheel by said fraction motor, said control apparatus determines if the measured linear velocity of said driven wheel minus the calculated linear velocity of said vehicle is greater than a predefined value and, if so, concludes that driven wheel slip is unacceptable.

6. The vehicle as set out in claim 5, wherein when a negative torque is being applied to said driven wheel by said traction motor, said control apparatus determines if the calculated linear velocity of said vehicle minus the measured linear velocity of said driven wheel is greater than the predefined value and, if so, concludes that driven wheel slip is unacceptable.

7. The vehicle as set out in claim 6, wherein said predefined value is equal to one mile/hour.

8. A vehicle comprising:
   a main body;
   a plurality of wheels coupled to said main body;
   a traction motor associated with said main body and coupled to at least one of said wheels for driving said one wheel;
   control apparatus coupled to said fraction motor and generating a motor drive signal to said traction motor;
   a first sensor for generating a velocity signal indicative of a velocity of said driven wheel;
   a further sensor for sensing an acceleration of said main body and generating a vehicle acceleration signal; and
   said control apparatus setting a timer for a predetermined time period when one or more vehicle conditions are met and during said predetermined time period determining a measured velocity of said driven wheel from said first sensor signal, calculating a velocity of said vehicle using said vehicle acceleration signal, and comparing said measured velocity of said driven wheel to said calculated velocity of said vehicle to determine wheel slip status.

9. The vehicle of claim 8, wherein said control apparatus determines said wheel slip status by estimating if unacceptable slip is occurring at said driven wheel based on said comparison of said measured velocity of said driven wheel and said calculated velocity of said vehicle.

10. The vehicle as set out in claim 9, wherein said control apparatus samples said vehicle acceleration signal during each of one or more predefined time periods during said predetermined time period to determine a new acceleration signal value and calculates a vehicle linear velocity change for each predefined time period by multiplying said new acceleration signal value by said time period.

11. The vehicle as set out in claim 10, wherein said control apparatus, at the start of said predetermined time period, defines an initial linear velocity of said vehicle as being equal to a current measured velocity of said driven wheel, adds a first vehicle linear velocity change to said initial linear velocity to get a first updated vehicle linear velocity and, thereafter, adds each subsequent linear velocity change to the prior updated vehicle linear velocity to get a new updated vehicle linear velocity.

12. The vehicle as set out in either claim 9 or claim 11, wherein when a positive torque is being applied to said driven wheel by said traction motor, said control apparatus determines if the measured linear velocity of said driven wheel minus the calculated linear velocity of said vehicle is greater than a predefined value and, if so, concludes that driven wheel slip is unacceptable.

13. The vehicle as set out in claim 12, wherein when a negative torque is being applied to said driven wheel by said traction motor, said control apparatus determines if the calculated linear velocity of said vehicle minus the measured linear velocity of said driven wheel is greater than the predefined value and, if so, concludes that driven wheel slip is unacceptable.

14. The vehicle as set out in claim 12, wherein said predefined value is equal to one mile/hour.

15. The vehicle as set out in claim 13, wherein said predefined value is equal to one mile/hour.

16. The vehicle as set out in claim 8, wherein said one or more vehicle conditions comprises a magnitude of a torque applied by said traction motor to said driven wheel being less than a predefined value.

17. The vehicle as set out in claim 16, wherein said predefined torque value is equal to 5 Nm.

18. The vehicle as set out in claim 17, wherein one of said wheels comprises a steerable wheel and said one or more vehicle conditions further comprises a steer angle of said steerable wheel being less than a predetermined value.

19. The vehicle as set out in claim 18, wherein said predetermined steerable wheel angle value is 20 degrees.

* * * * *

UNITED STATES PATENT AND TRADEMARK OFFICE
CERTIFICATE OF CORRECTION

| | | |
|---|---|---|
| PATENT NO. | : 8,649,953 B2 | Page 1 of 1 |
| APPLICATION NO. | : 12/432069 | |
| DATED | : February 11, 2014 | |
| INVENTOR(S) | : Nicholas J. Sherman | |

It is certified that error appears in the above-identified patent and that said Letters Patent is hereby corrected as shown below:

In the Claims:

Col. 14, line 46, "of "11" and the magnitude of" should read --of "1" and the magnitude of--;

Col. 15, line 66, "by said fraction motor" should read --by said traction motor--;

Col. 16, line 19, "coupled to said fraction motor" should read --coupled to said traction motor--.

Signed and Sealed this
Twenty-second Day of April, 2014

Michelle K. Lee
*Deputy Director of the United States Patent and Trademark Office*